United States Patent
Pan

(10) Patent No.: US 8,364,100 B2
(45) Date of Patent: Jan. 29, 2013

(54) METHOD AND SYSTEM FOR A TRANSMITTER LOFT CANCELLATION SCHEME THAT MAINTAINS IQ BALANCE

(75) Inventor: Meng-An Pan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 264 days.

(21) Appl. No.: 12/792,905

(22) Filed: Jun. 3, 2010

(65) Prior Publication Data

US 2010/0311366 A1 Dec. 9, 2010

Related U.S. Application Data

(63) Continuation of application No. 11/617,479, filed on Dec. 28, 2006, now Pat. No. 7,734,259.

(60) Provisional application No. 60/868,818, filed on Dec. 6, 2006.

(51) Int. Cl.
*H04B 1/04* (2006.01)

(52) U.S. Cl. ............ 455/114.2; 455/333; 455/284; 455/285; 455/264; 455/315

(58) Field of Classification Search .......... 455/114.2, 455/333, 284, 285, 264, 315, 293, 295
See application file for complete search history.

(56) References Cited

U.S. PATENT DOCUMENTS

| 6,393,260 B1 * | 5/2002 | Murtojarvi et al. ............ 455/91 |
| 7,561,862 B2 * | 7/2009 | Woo-nyun .................. 455/226.1 |
| 2006/0094395 A1 * | 5/2006 | Lee et al. ..................... 455/333 |

* cited by examiner

*Primary Examiner* — Sanh Phu
(74) *Attorney, Agent, or Firm* — Thomas|Horstemeyer, LLP.

(57) ABSTRACT

Methods and systems for a transmitter LOFT cancellation scheme that maintains IQ balance are disclosed. Aspects of one method may include providing current compensation to both differential inputs of a mixer for each of I and Q channels. An initial current compensation of X units may be provided, followed by subsequent compensation as needed. The initial compensation may be provided to each differential input of the mixers used for I and Q channels. The subsequent current compensation for the I channel may be independent of the subsequent current compensation for the Q channel. Subsequent current compensation to a first differential input for a mixer may be increased by Y units while decreasing current compensation to the second differential input of the mixer by Y units. In this manner, the DC common mode level for the mixer may remain the same at the initial DC compensation current of X units for both mixers.

20 Claims, 7 Drawing Sheets

METHOD AND SYSTEM FOR A TRANSMITTER LOFT CANCELLATION SCHEME THAT MAINTAINS IQ BALANCE

CROSS-REFERENCE TO RELATED APPLICATIONS/INCORPORATION BY REFERENCE

This application is a continuation of U.S. application Ser. No. 11/617,479 filed on Dec. 28, 2006, now U.S. Pat. No. 7,734,259 which application makes reference to, claims priority to, and claims benefit of U.S. Provisional Application Ser. No. 60/868,818 filed Dec. 6, 2006.

This application also makes reference to the U.S. patent application Ser. No. 11/617,458 filed Dec. 28, 2006, issued as U.S. Pat. No. 7,583,143 on Sep. 1, 2009.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless systems. More specifically, certain embodiments of the invention relate to a method and system for a transmitter LOFT cancellation scheme that maintains IQ balance.

BACKGROUND OF THE INVENTION

In some conventional systems, a transmitter may broadcast radio frequency (RF) signals. Generally, RF signals are generated by upconverting baseband signals to intermediate frequency (IF) signals, and then further upconverting the IF signals to RF signals, or directly upconverting from baseband signals to RF signals. The RF signals may be amplified by power amplifiers before being transmitted by a transmit antenna. Due to the proliferation of wireless devices such as telephones, walkie-talkies, personal digital assistants (PDAs), and routers in home computer networks, a transmitted signal may need to be at a certain minimum strength in order for a receiving device to demodulate the transmitted signal.

Generally, controlling output power of a transmitter is extremely important to minimize interference with other transmitted signals while still providing enough transmitted signal strength to be able to be received and processed by a receiver. In addition, a transmitter of limited power source, for example, mobile communication handset with a small battery, may need to accurately control power output in order to maximize battery life. However, a problem may be that performance of various electronic circuitry, for example, local oscillators (LO), may leak signals called LO feedthrough (LOFT) to different parts of the transmitter (TX) signal path such that transmitted output consists of an LO tone. Unwanted DC components before an up-conversion mixer may also be up converted to RF output and result in an unwanted LOFT tone at the output of the transmitted signal. If left unabated, LOFT may result in undesired frequencies being transmitted, thereby corrupting the transmitted signal to make it unusable. Attempts to attenuate the LOFT may be referred to as LOFT cancellation.

Another problem may be in-phase and quadrature (IQ) imbalance, also called an image problem. The IQ imbalance comes from a mismatch between TX I path and TX Q path. The IQ imbalance may also corrupt the transmitted signal. Conventional transmitters may perform LOFT cancellation after performing gain control. After LOFT cancellation, IQ balance may not be maintained and IQ balance calibration may need to be done. Accordingly, the transmitter may need to perform both LOFT cancellation and IQ balance calibration when gain control is performed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a transmitter LOFT cancellation scheme that maintains IQ balance, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a transmitter LOFT cancellation scheme that maintains IQ balance. Aspects of the method may comprise supplying current for current compensation to both differential inputs of a fully differential mixer for the I channel and to both differential inputs of a fully differential mixer for the Q channel, to reduce local oscillator feed through without introducing a difference in DC common mode level between the I channel and the Q channel. The difference in DC common mode level may result in an IQ imbalance. The DC common mode level may be defined as an average of the differential signals, that is, one-half of the sum of the positive output plus the negative output. The current compensation may be an initial amount of X units of current, and subsequent amounts of Y units of current, where X may be greater than Y. Initial compensation may comprise X units of current for each differential input of each mixer used for I and Q channels.

The subsequent current compensation by Y units of current for the I channel may be independent of the subsequent current compensation by Y units of current for the Q channel. The subsequent current compensation by Y units of current may comprise increasing current compensation by Y units to a first differential input of the fully differential mixer while decreasing current compensation by Y units to a second differential input of the fully differential mixer. In this manner, the DC common mode level for the I channel may remain the same as the DC common mode level for the Q channel. Using this method, a DC difference may be created differentially around its DC common mode level independently for I and Q for LOFT cancellation, while a DC common mode level for I and Q may be maintained, and, hence, the IQ balance may also be maintained.

Figure 1B:
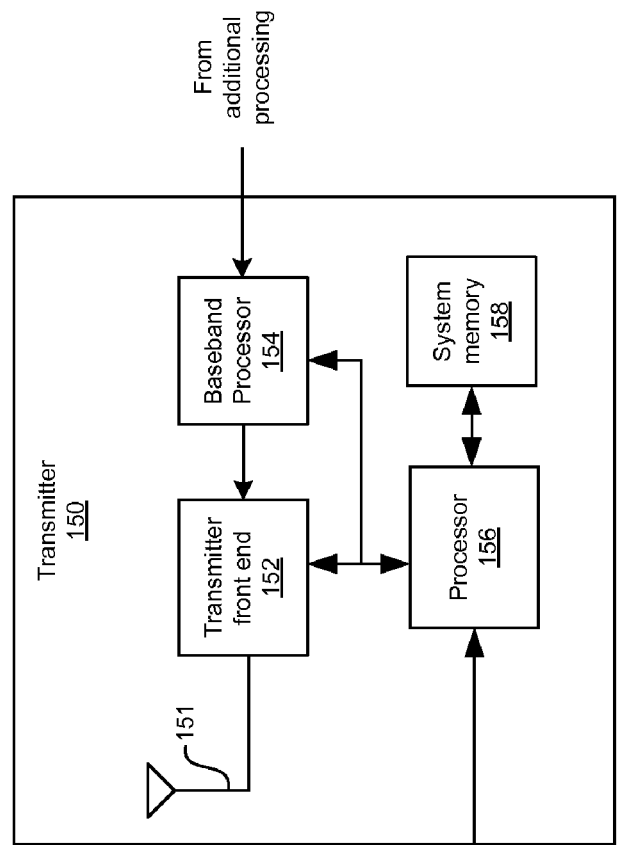
FIG. 1B is a block diagram of an exemplary transmitter block of FIG. 1A, for example, which may be utilized in connection with an embodiment of the invention.
Figure 1A:
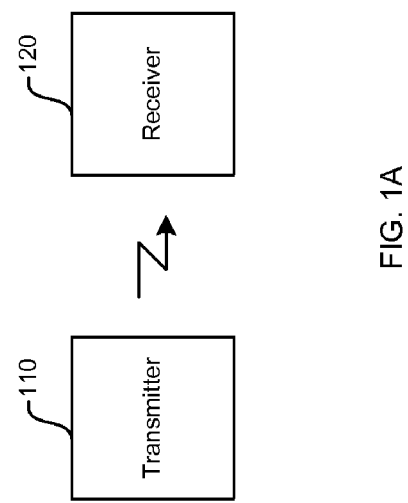
FIG. 1A is a block diagram of an exemplary transmitter system and receiver system, which may be utilized in connection with an embodiment of the invention.

FIG. 1A is a block diagram of an exemplary transmitter system and receiver system that may be utilized in connection with an embodiment of the invention. Referring to FIG. 1A, there is shown a transmitter block 110 and a receiver block 120. The transmitter block 110 may comprise suitable logic, circuitry, and/or code that may be adapted to filter, modulate, and amplify a baseband signal to an RF signal, and transmit the RF signal. The receiver block 120 may comprise suitable logic, circuitry, and/or code that may be adapted to receive the RF signal and to demodulate the RF signal to the baseband signal.

In operation, the transmitter block 110 may be adapted to transmit RF signals over a wired or wireless medium. The receiver block 120 may be adapted to receive the RF signals and process it to a baseband signal that may be suitable for further processing, for example, as data or voice. The transmitter block 110 may be part of a wireless communication device, and the receiver block 120 may be part of another wireless communication device.

FIG. 1B is a block diagram of an exemplary transmitter system of FIG. 1A, for example, that may be utilized in connection with an embodiment of the invention. Referring to FIG. 1B, the RF transmitter system 150 may comprise a transmitting antenna 151, a transmitter front end 152, a baseband processor 154, a processor 156, and a system memory 158. The transmitter front end (TFE) 152 may comprise suitable logic, circuitry, and/or code that may be adapted to upconvert a baseband signal directly to an RF signal and to transmit the RF signal via a transmitting antenna 151. The TFE 152 may also be adapted to upconvert a baseband signal to an IF signal, and/or upconvert the IF signal to an RF signal and then transmit the RF signal via the transmitting antenna 151. The TFE 152 may be adapted to execute other functions, for example, filtering the baseband signal, and/or amplifying the baseband signal.

The baseband processor 154 may comprise suitable logic, circuitry, and/or code that may be adapted to process baseband signals, for example, convert a digital signal to an analog signal, and/or vice-versa. The processor 156 may be any suitable processor or controller such as a central processing unit (CPU) or digital signal processor (DSP), or any type of integrated circuit processor. The processor 156 may comprise suitable logic, circuitry, and/or code that may be adapted to control the operations of the TFE 152 and/or the baseband processor 154. For example, the processor 156 may be utilized to update and/or modify programmable parameters and/or values in a plurality of components, devices, and/or processing elements in the TFE 152 and/or the baseband processor 154. Control and/or data information, which may include the programmable parameters, may be transferred from at least one controller and/or processor, which may be external to the RF transmitter system 150, to the processor 156. Similarly, the processor 156 may be adapted to transfer control and/or data information, which may include the programmable parameters, to at least one controller and/or processor, which may be externally coupled to the RF transmitter block 110.

The processor 156 may utilize the received control and/or data information, which may comprise the programmable parameters, to determine an operating mode of the TFE 152. For example, the processor 156 may be utilized to select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 158 via the processor 156. The information stored in system memory 158 may be transferred to the TFE 152 from the system memory 158 via the processor 156. The system memory 158 may comprise suitable logic, circuitry, and/or code that may be adapted to store a plurality of control and/or data information, including parameters needed to calculate frequencies and/or gain, and/or the frequency value and/or gain value.

Figure 2A:
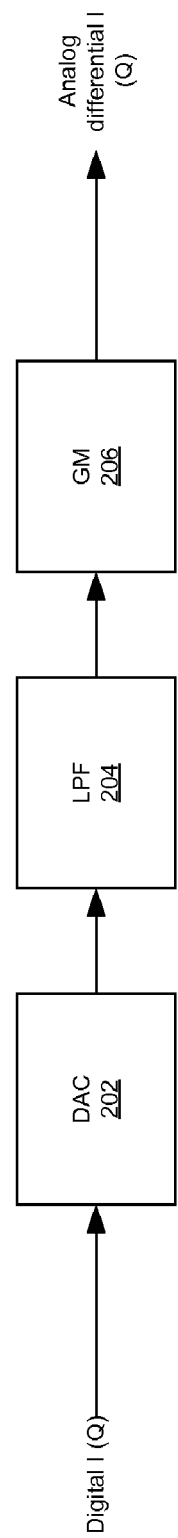
FIG. 2A is a block diagram of an exemplary transmitter front end, which may be utilized in connection with an embodiment of the invention.

FIG. 2A is a block diagram of an exemplary transmitter front end, which may be utilized in connection with an embodiment of the invention. Referring to FIG. 2, there is shown a digital-to-analog converter (DAC) block 202, a lowpass filter (LPF) block 204, and a Gm block 206 for each of I and Q channels for a signal to be transmitted. The DAC block 202 may convert digital signals from, for example, the baseband processor 154, to two analog differential voltage outputs. The LPF block 204 may independently filter the differential analog voltage outputs from the DAC block 202. The Gm block 206 may generate differential current outputs that may correspond to the filtered differential analog voltage outputs communicated by the LPF block 204. Accordingly, the I channel may be processed by a first DAC block 202, a first LPF block 204, and a first Gm block 206, and the Q channel may be processed by a second DAC block 202, a second LPF block 204, and a second Gm block 206.

Figure 2B:
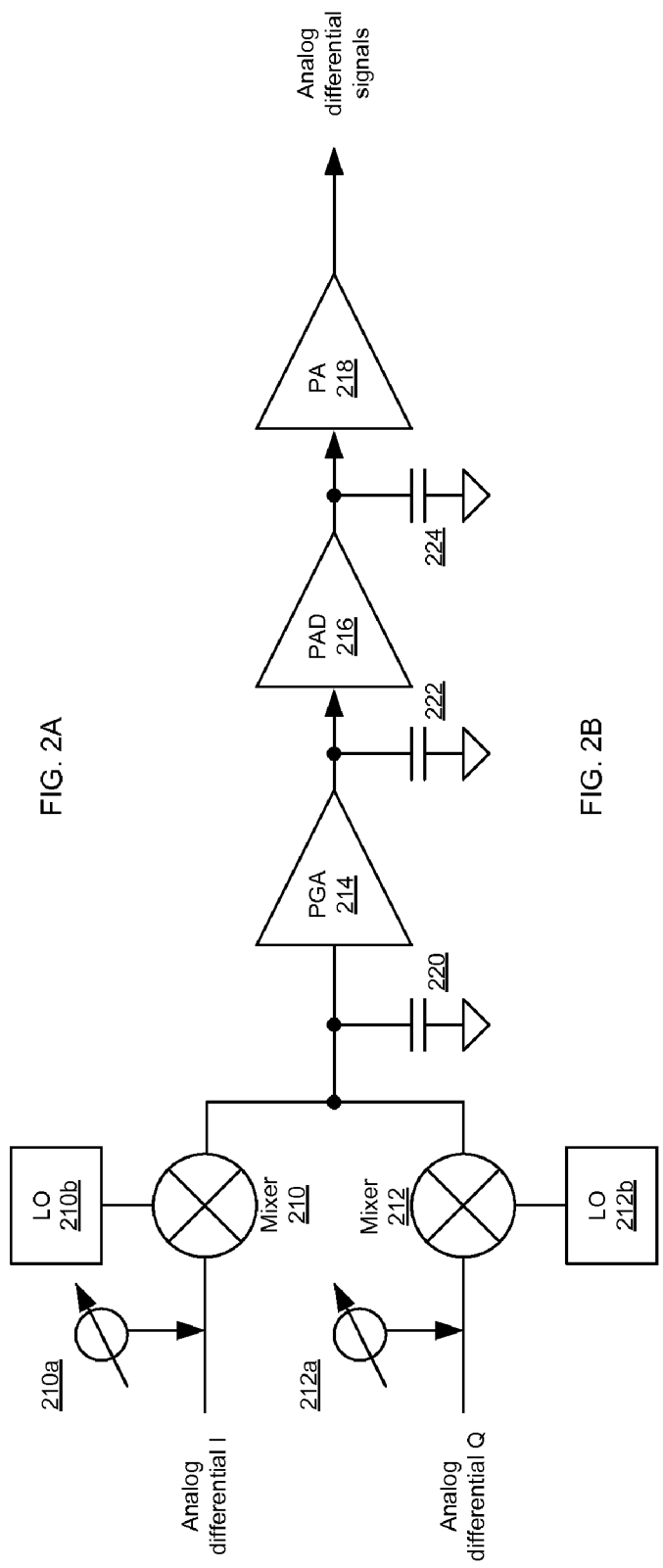
FIG. 2B is a block diagram of an exemplary transmitter front end, which may be utilized in connection with an embodiment of the invention.

FIG. 2B is a block diagram of an exemplary transmitter front end, which may be utilized in connection with an embodiment of the invention. Referring to FIG. 2B, there is shown mixer blocks 210 and 212, variable current source blocks 210a and 212b, local oscillators (LOs) 210b and 212b, a programmable gain amplifier (PGA) block 214, a power amplifier driver (PAD) block 216, the power amplifier (PA) block 218, and capacitive loads 220, 222, and 224. The mixer blocks 210 and 212 may upconvert each of differential input signals to generate differential output signals that may be at a radio frequency used for transmission. The mixer blocks 210 and 212 may also amplify the differential input signals.

The variable current source blocks 210a and 212a may comprise suitable logic, circuitry, and/or code that may be used to generate DC compensation currents to compensate for any undesired effects resulting from local oscillator feedthrough (LOFT) in differential signals processed by the transmitter front end 152. The amount of current from each of the variable current source blocks 210a and 212a may be controlled by circuitry and/or a processor, for example, the baseband processor 154 and/or the processor 156. The PGA block 214 may amplify differential input signals with variable gain to generate differential output signals. The gain of the PGA block 214 may be adjusted by circuitry and/or a processor, such as, for example, the baseband processor 154 or the processor 156. The PAD block 216 and the PA block 218 may amplify differential input signals to generate differential output signals. The capacitive loads 220, 222, and 224 may comprise suitable logic, circuitry, and/or code that may enable varying a capacitive load to the mixer blocks 210 and 212, the PGA block 214, and the PAD block 224, respectively, to tune the center frequency for each of the blocks. For example, this may compensate for changes in operation characteristics due to temperature. The U.S. patent application Ser. No. 11/617,458 filed Dec. 28, 2006, issued as U.S. Pat. No. 7,583,143 on Sep. 1, 2009 discusses digitally controlled capacitive loads that may be used as the capacitive loads 220, 222, and 224.

In operation, the differential signals may be upconverted to radio frequency by the mixer blocks 210 and 212, and the differential signals from the outputs of the mixer blocks 210 and 212 may form a single pair of differential signals. However, LOFT may be picked up by the transmit circuitry, such as, for example, by the analog path from the mixer blocks 210 and 212 to the PA block 218. A portion of the analog path may act as an antenna to receive LOFT from the LOs 210b and 212b, or directly receive leakage in the LOs 210b and 212b via an electrical connection. LOFT may also be present at the output of the mixer block 210 or 212 due to DC offset from the DAC block 202, the LPF block 204, and/or the Gm block 206 due to device mismatch of differential circuits. The DC offset may be defined as a difference between the differential signals, that is, output of the positive differential signal minus output of the negative differential signal.

DC currents from the current source blocks 210a and 212a may be used to reduce LOFT in the analog path. However, use of the current source blocks 210a and 212a for the I and Q channels, respectively, may result in different DC common mode levels for the baseband signals communicated to the mixer blocks 210 and 212. Accordingly, there may be an undesired signal imbalance between the I and Q channels, which may result in additional unwanted RF image being generated for transmission. Further calibration may then be needed to attenuate the unwanted image. An exemplary embodiment of the invention is described with respect to FIGS. 3-7 for LOFT cancellation for the transmitter block 150 by injecting DC current from the variable current sources 210a and 212a while maintaining DC common mode current level between the I and Q channels, or maintaining IQ balance. Hence, IQ balance calibration or image calibration may not be required after LOFT is performed.

Figure 3:
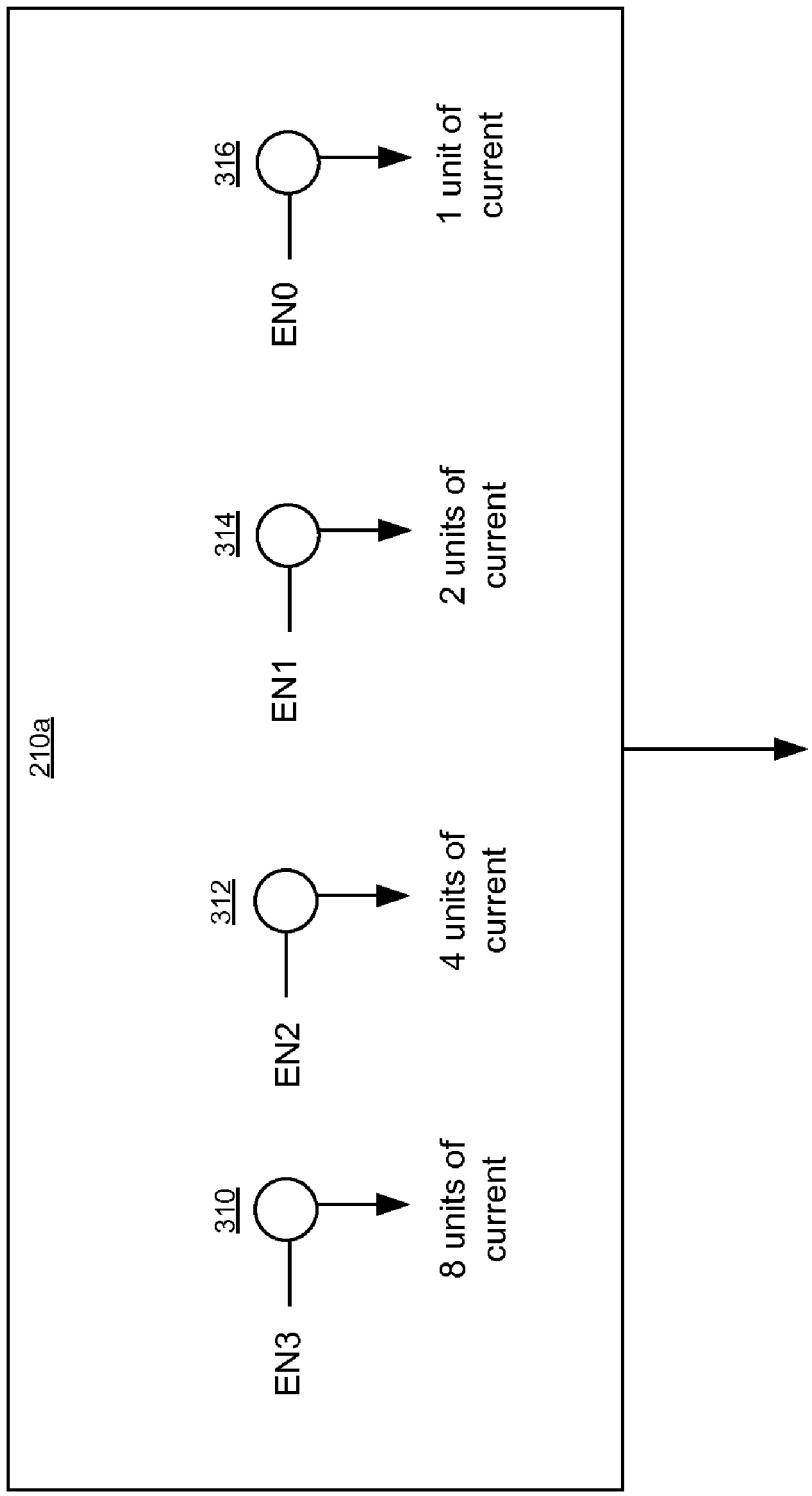
FIG. 3 is a block diagram of an exemplary current compensation circuit in a transmitter front end, in accordance with an embodiment of the invention.

FIG. 3 is a block diagram of an exemplary current compensation circuit in a transmitter front end, in accordance with an embodiment of the invention. Referring to FIG. 3, there is shown the variable current source block 210a, which may comprise current sources 310, 312, 314, and 316. The current sources 310, 312, 314, and 316 may generate different amounts of current by being, for example, binary weighted. Accordingly, the four current sources 310, 312, 314, and 316 may generate, for example, eight units of current, four units of current, two units of current, and one unit of current. For example, if each unit of current is 40 uA, the current source 316 may generate 40 uA of current, the current source 314 may generate 80 uA of current, the current source 312 may generate 160 uA of current, and the current source 310 may generate 320 uA of current.

The current sources 310, 312, 314, and 316 may be enabled by, for example, enable signals EN3, EN2, EN1, and EN0, respectively. The enabling of the current sources 310, 312, 314, and 316 may be controlled by circuitry and/or processors, such as, for example, the baseband processor 154 and/or the processor 156. By appropriate control of the enable signals EN3, EN2, EN1, and EN0, the variable current source block 210a may provide an output current from 40 uA to 600 uA in 40 uA increments. If no current source is enabled, there would be no output current provided by the variable current source block 210a. The number of current sources and the unit of current may be design dependent.

Figure 4:
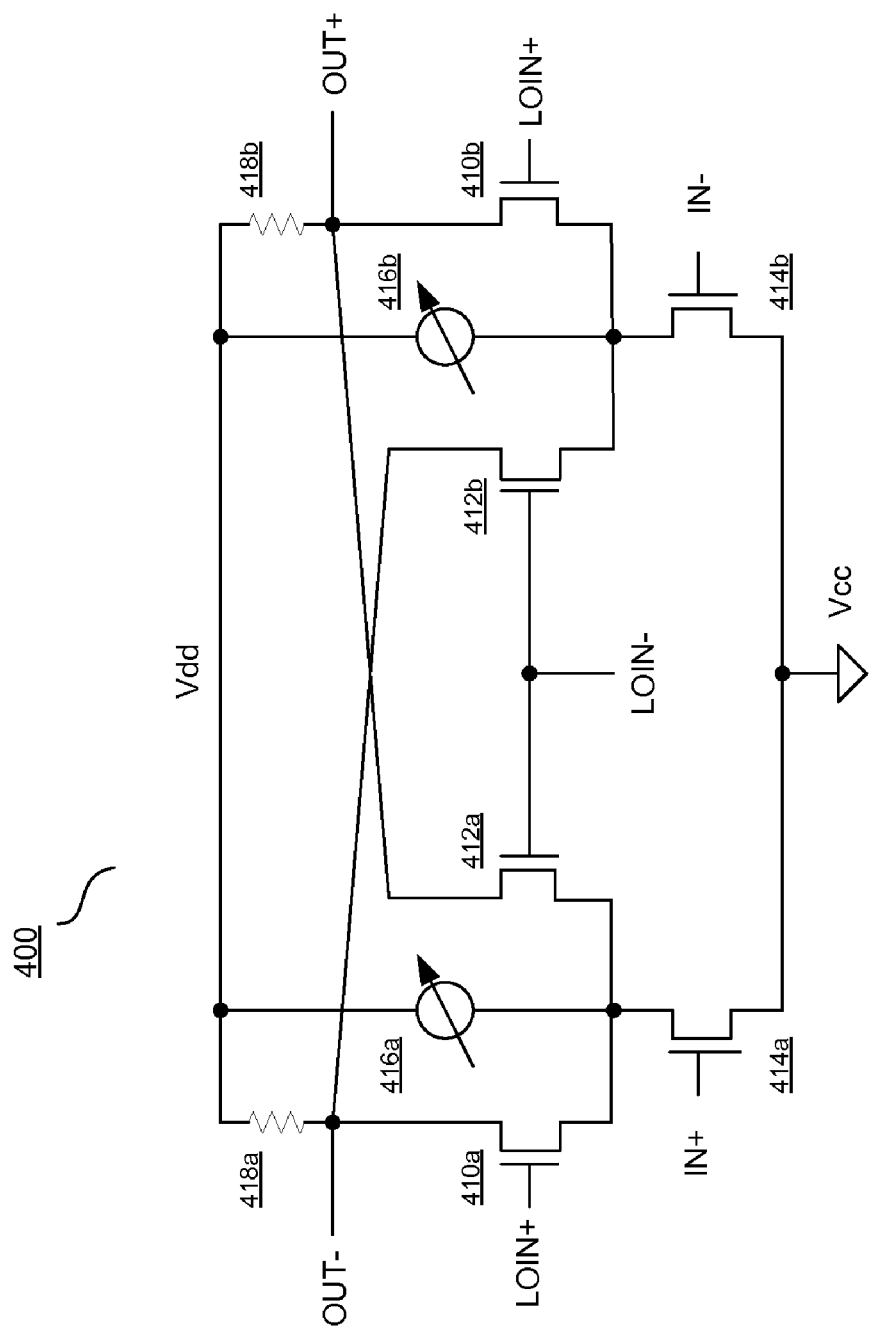
FIG. 4 is a block diagram of an exemplary fully differential mixer, in accordance with an embodiment of the invention.

FIG. 4 is a block diagram of an exemplary fully differential mixer, in accordance with an embodiment of the invention. Referring to FIG. 4, there is shown a fully differential mixer 400, which has two differential input signals and two differential output signals. The fully differential mixer 400 may be, for example, an exemplary embodiment of the mixer block 210 or 212. The fully differential mixer 400 may comprise transistors 410a, 410b, 412a, and 412b, and resistive devices 418a and 418b. The transistors 414a and 414b may be for illustration of current from the Gm block 206, and the variable current sources 416a and 416b may be, for example, the variable current source block 210a. The transistors 414a and 414b and the variable current sources 416a and 416b may be shown with the fully differential mixer 400 for illustrative purposes.

In operation, differential local oscillator signals LOIN+ and LOIN− from, for example, the LO 210b or 212b, may be communicated to gates of the transistors 410a, 410b, 412a, and 412b. The gates of the transistors 410a and 410b may receive, for example, the local oscillator signal LOIN+, and the gates of the transistors 412a and 412b may receive, for example, the local oscillator signal LOIN−. Differential input signals IN+ and IN− for the I channel or the Q channel may be communicated within, for example, the Gm block 206 to the gates of the transistors 414a and 414b, respectively, which may be a last stage of the GM block. The drains of the transistors 410a and 412b, and 410b and 412a may output the differential output signals OUT− and OUT+, respectively, based on the differential input signals IN+ and IN− and the differential local oscillator signals LOIN+ and LOIN−.

The variable current source blocks 416a and 416b may be used to generate required DC components that may be up converted to RF output to cancel the LOFT, which may be either from direct coupling of LO signal to TX output or unwanted DC components being up converted to RF output. This may be referred to as LOFT cancellation.

Figure 5:
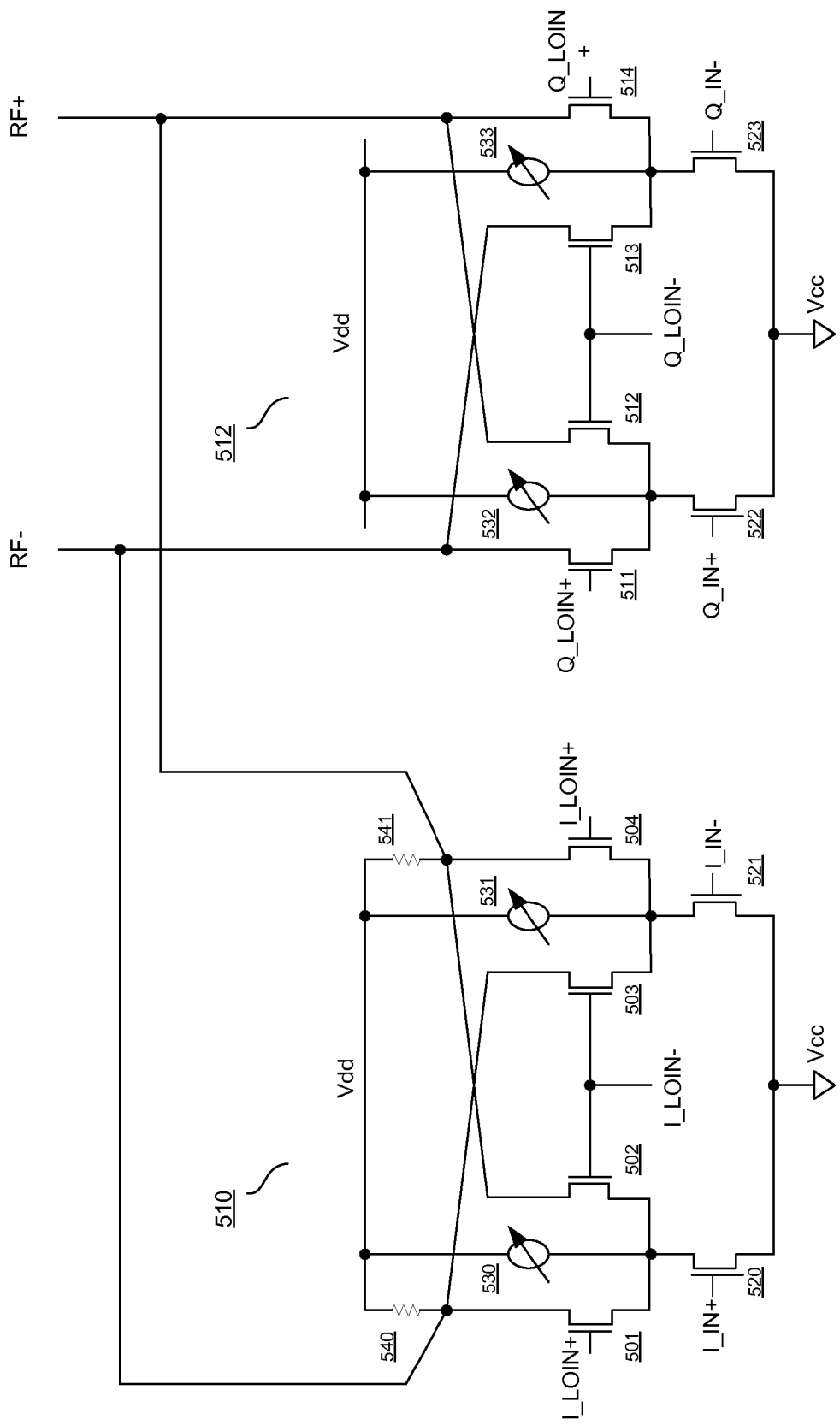
FIG. 5 is an exemplary block diagram showing usage of fully differential mixers for I and Q channels, in accordance with an embodiment of the invention.

FIG. 5 is an exemplary block diagram showing usage of fully differential mixers for I and Q channels, in accordance with an embodiment of the invention. Referring to FIG. 5, there is shown the mixer blocks 510 and 512, which may comprise the transistors 501, 502, 503, 504, 511, 512, 513, and 514, where each mixer block may be substantially similar to the fully differential mixer block described with respect to FIG. 4. There is also shown portions of the Gm block 206 that may comprise the transistors 520, 521, 522, and 523. There is further shown the variable current source blocks 530, 531, 532, and 533, which may be similar to the current source blocks 210a and 212a.

The mixer block 510 may be used to, for example, upconvert currents due to the differential signals I_IN+ and I_IN− for the I channel, and the mixer block 512 may be used to upconvert currents due to the differential signals Q_IN+ and Q_IN– for the Q channel. The mixer blocks 510 and 512 may share common loads 540 and 541. Accordingly, the output of the mixer blocks 510 and 512 may be combined together to form the differential signals RF+ and RF–. The differential signals RF+ and RF– may be amplified by, for example, the PGA 214, the PAD 216, and the PA 218.

Figure 6:
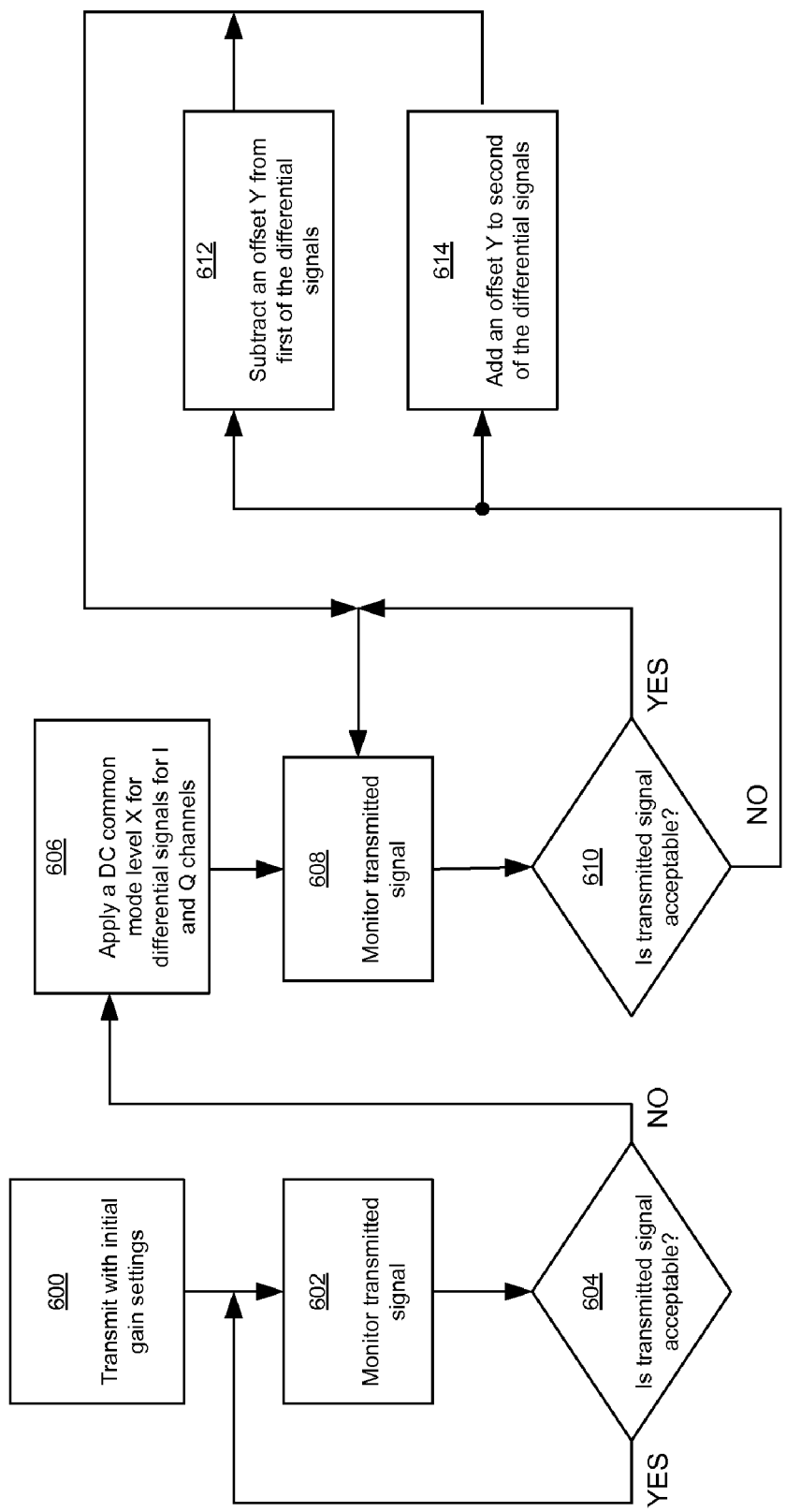
FIG. 6 is an exemplary flow diagram for performing LOFT cancellation while maintaining transmitter IQ signal DC common mode level and IQ balance, in accordance with an embodiment of the invention.

FIG. 6 is an exemplary flow diagram for performing LOFT cancellation while maintaining transmitter IQ signal DC common mode level and IQ balance, in accordance with an embodiment of the invention. Referring to FIG. 6, there is shown steps 600 to 614 for adding compensation currents to the I and Q channels to reduce the overall TX LOFT while maintaining IQ balance. In step 600, the transmitter may transmit signals with initial gain settings. In step 602, the transmitted signals may be monitored to determine effects of the LOFT for the transmitted RF signal.

In step 604, it may be determined whether the LOFT for the transmitted signal may be acceptable. The determination may be made by a circuitry and/or a processor, such as, for example, the transmitter front end 152, the baseband processor 154, and/or the processor 156, and may be based on, for example, feedback from the receiver 120 and/or an algorithm. If the effects of the LOFT on the transmitted signal is acceptable, the next step may be step 602. If effects of the LOFT on the transmitted signal is not acceptable, the next step may be step 606. In step 606, a DC common mode current level X may be applied to the differential signals of the I channel and the Q channel. The DC common mode current level X may be communicated to the variable current source blocks 210a and 212a. Accordingly, the variable current source blocks 210a and 212a may communicate a similar amount of compensation current for each of the signals I_IN+, I_IN–, Q_IN+, and Q_IN–. The DC common mode current level X may depend on, for example, the number of bits allocated for controlling the variable current source blocks 210a and 212a. For example, the DC common mode current level X may be approximately one-half of the maximum current available from the variable current source block 210a or 212a.

In step 608, the transmitted signals may be monitored to determine effects of the LOFT for the transmitted RF signal. In step 610, it may be determined whether the transmitted signal is acceptable. The determination may be made by circuitry and/or a processor, such as, for example, the transmitter front end 152, the baseband processor 154, and/or the processor 156. If the effects of the LOFT on the transmitted signal is acceptable, the next step may be step 608. If the effects of the LOFT on the transmitted signal is not acceptable, the next step may be the steps 612 and 614. In step 612, a DC compensation current Y may be added to the differential signals for the I channel, and independently for the Q channel. For example, the DC compensation current Y may be added to a present current compensation for the signal I_IN+ while the DC compensation current Y may be subtracted, for example, from the present current compensation for the signal I_IN–. In this manner, the DC common mode current level for the I channel may remain at X, while the DC compensation currents for the differential signals I_IN+ and I_IN– may change. The smallest value for the DC compensation current Y may be, for example, the minimum amount by which the current source block 210a or 212a may be able to change the output current. The next step may be step 608.

Similarly, in step 614, an DC compensation current Y may be added, for example, to a present current compensation for the signal Q_IN+ while the DC compensation current Y may be subtracted, for example, from the present current compensation for the signal Q_IN–. In this manner, the DC common mode current level for the Q channel may remain at X, while the DC compensation currents for the differential signals Q_IN+ and Q_IN– may change. Accordingly, the DC compensation currents for the differential signals for the I channel may be changed independently of the DC compensation currents for the differential signals for the Q channel while still keeping the DC common mode current level for the I channel the same as the DC common mode current level for the Q channel. Accordingly, each of the mixer blocks 210 and 212 may be calibrated for LOFT cancellation without introducing IQ imbalance. The next step may be step 608.

Figure 7:
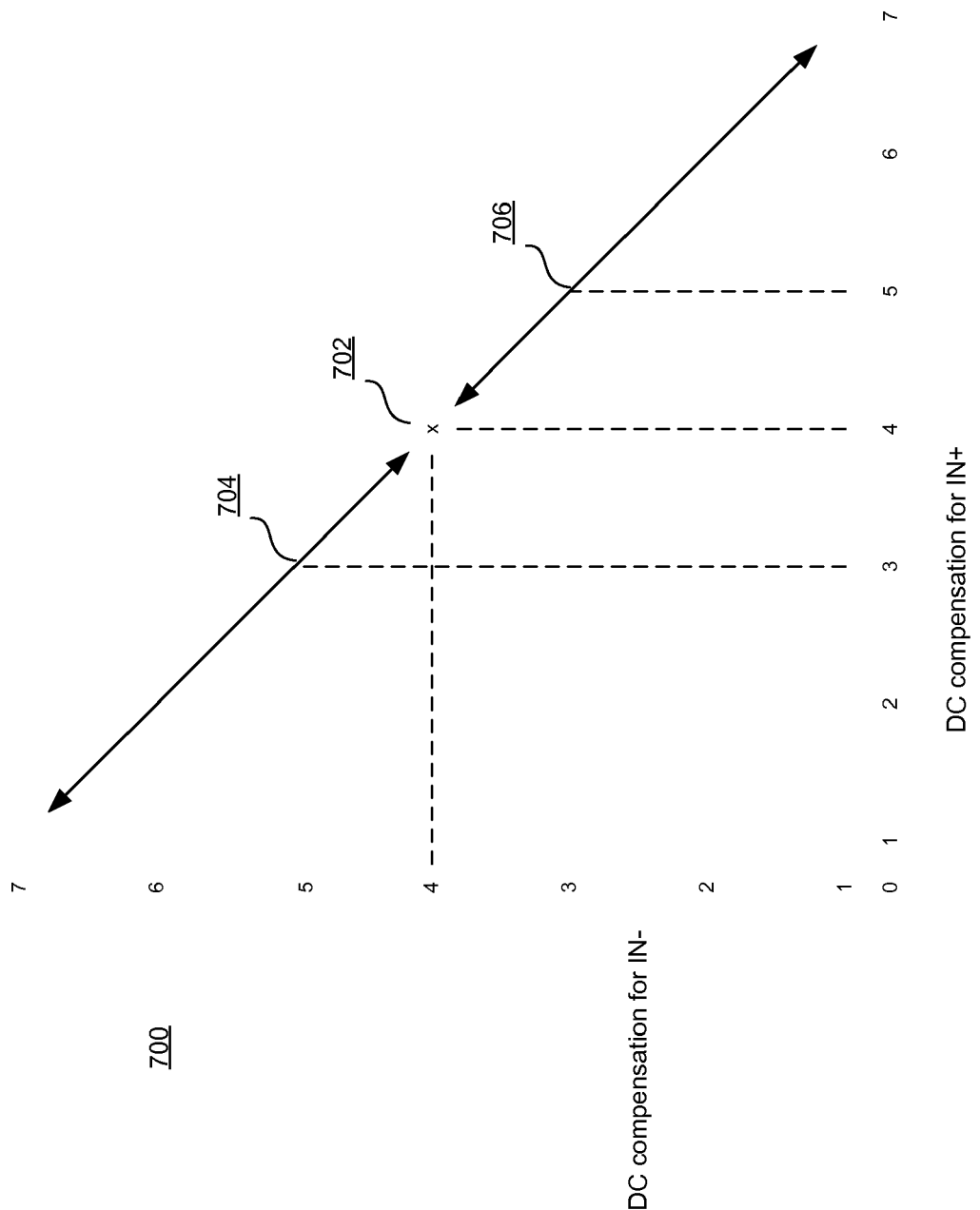
FIG. 7 is an exemplary DC compensation current chart that may be used in illustrating LOFT cancellation that maintains IQ balance in a transmitter, in accordance with an embodiment of the invention.

FIG. 7 is an exemplary DC compensation current chart that may be used in maintaining IQ balance in a transmitter, in accordance with an embodiment of the invention. Referring to FIG. 7, there is shown a chart 700 where the horizontal axis may indicate an amount of DC compensation current for the signal I_IN+. The vertical axis of the chart 700 may indicate an amount of DC compensation current for the signal I_IN–. The exemplary chart 700 uses 3 bits for controlling variable current source blocks, such as the variable current source blocks 210a and 212a. Accordingly, the number of different DC compensation current values may be eight. The initial DC common mode current level 702 may be the same for the signals I_IN+ and I_IN–.

If it is determined that the DC compensation current for the signal I_IN+ needs to be smaller and/or the DC compensation current for the signal I_IN– needs to be larger, then the chart may be followed to the left. This may indicate that the DC compensation current for I_IN+ may be decreased and the DC compensation current for I_IN– may be increased, while the DC common mode current level for the I channel may remain at the initial DC common mode current level 702. For example, if the initial DC common mode current level 702 is four for both I_IN+ and I_IN–, moving to the DC compensation current level 704 may change the DC compensation current for I_IN+ to 3, while changing the DC compensation current for I_IN– to 5. The I_IN+ DC compensation current may therefore be described as four minus one, while the I_IN– DC compensation current may be described as four plus one.

Similarly, if it is determined that the DC compensation current for the signal I_IN+ needs to be larger and/or DC compensation current for the signal I_IN– needs to be smaller, then the chart may be followed to the right. This may indicate that the DC compensation current for I_IN+ may be increased and the DC compensation current for I_IN– may be decreased, while the DC common mode current level for the I channel may remain at the initial DC common mode current level 702. For example, if the initial DC common mode current level 702 is four for both I_IN+ and I_IN–, moving to the DC compensation current level 706 may change the DC compensation current for I_IN+ to 5, while changing the DC compensation current for I_IN– to 3. The I_IN+ DC compensation current may therefore be described as four plus one, while the LIN– DC compensation current may be described as four minus one. A similar chart may be used independently for the Q channel. Since, the initial DC common mode current level 702 may be the same for both I and Q channels, the DC common mode current level for the I channel may be the same as the DC common mode current level for the Q channel.

While the chart 700 may have used eight values for 3-bit control of variable current source blocks, the invention need not be so limited. For example, 16 values may be used with 4-bit control. The specific number of values and control bits may be dependent on the amount of DC compensation current that may be generated, and the granularity with which a variable current source block may output the DC compensation current. Additionally, the initial DC common mode current level 702 may be larger than subsequent compensations. Accordingly, a quick coarse compensation may be fine-tuned with subsequent compensations, where the subsequent compensations may also vary. The specific amounts of initial and subsequent compensations may be design and/or implementation dependent.

In accordance with an embodiment of the invention, aspects of an exemplary system may comprise, for example, the variable current source blocks 210a and 212a that provide current compensation to the mixer blocks 210 and 212. The variable current source blocks 210a and 212a may be used for LOFT cancellation in the mixer blocks 210 and 212. The current compensation may be applied to both I and Q channels while maintaining IQ balance. The current compensation may be provided to both differential inputs of each of the mixer blocks 210 and 212 for the I and Q channels. Determination of whether current compensation may be needed may be made by, for example, monitoring overall transmitter output in the transmitter front end 152, such as, for example, the differential signals that may be outputs of the PA 218. If the LOFT is acceptable, current compensation may not be needed. If the LOFT is not acceptable, current compensation, as described with respect to FIG. 6, may be applied.

If compensation is needed, the variable current source blocks 210a and 212a may be controlled, for example, by the baseband processor 154 and/or the processor 156, to adjust current compensation by increments of X or Y. The variable current source blocks 210a and 212a may allow an initial current compensation of X units of current and subsequent current compensations may change by Y units of current, where Y may be less than X. The current compensation may be provided to each differential input of the fully differential mixers for the I and Q channels.

After the initial current compensation, the variable current source block 210a may, for example, increase the current compensation to a first differential input to the mixer block 210 by Y while decreasing the current compensation to a second differential input to the mixer block 210 by Y. Similarly, the variable current source block 212a may also increase the current compensation to a first differential input to the mixer block 212 by Y while decreasing the current compensation to a second differential input to the mixer block 212 by Y. The current compensation by Y to the mixer block 210 may be accomplished independently of the current compensation by Y to the mixer block 212.

Since the current compensation Y to one of the differential inputs is opposite to the current compensation to the other differential input, the common mode current compensation may remain constant at X units of current. Accordingly, the mixer blocks 210 and 212 may have the same DC common mode of X units of current regardless of the adjustment to the differential inputs to the mixer blocks 210 and 212. Therefore, the DC common mode current levels for the I channel, which may be processed by the mixer block 210, for example, and the Q channel, which may be processed by the mixer block 212, for example, may be the same. Accordingly, there may not be an IQ imbalance introduced when performing LOFT cancellation.

Another embodiment of the invention may provide a machine-readable storage, having stored thereon, a computer program having at least one code section executable by a machine, thereby causing the machine to perform the steps as described above for transmitter LOFT cancellation scheme that maintains IQ balance.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for processing signals, the method comprising:
increasing, in a transmitter, a current supplied to a first differential input of a fully differential mixer for an I (in-phase component) channel by a direct current (DC) compensation current amount;
decreasing, in the transmitter, a current supplied to a second differential input of the fully differential mixer for the I channel by the DC compensation current amount; and
independently adjusting a current supplied to a first differential input of a fully differential mixer for a Q (quadrature component) channel and independently adjusting a current supplied to a second differential input of the fully differential mixer for the Q channel.

2. The method according to claim 1, comprising adjusting the current supplied to the first differential input of the fully differential mixer for the Q channel according to a DC common mode current amount and adjusting the current supplied to the second differential input of the fully differential mixer for the Q channel according to the DC common mode current amount.

3. The method according to claim 2, comprising adjusting the current supplied to the first differential input of the fully differential mixer for the I channel according to the DC common mode current amount and adjusting the current supplied to the second differential input of the fully differential mixer for the I channel according to the DC common mode current amount.

4. The method according to claim 3, wherein the DC common mode current amount is variable.

5. The method according to claim 3, wherein the DC compensation current amount is variable.

6. The method according to claim 1, wherein the DC compensation current amount is a first DC compensation current amount, wherein the method further comprises increasing the current supplied to the first differential input of the fully differential mixer for the Q channel by a second DC compensation current amount and decreasing the current supplied to the second differential input of the fully differential mixer for the Q channel by the second DC compensation current amount.

7. A machine-readable storage having stored thereon, a computer program having at least one code section for processing signals, the at least one code section being executable by a machine for causing the machine to:
increase, in a transmitter, a current supplied to a first differential input of a fully differential mixer for a Q (quadrature component) channel by a direct current (DC) compensation current amount; and
decrease a current supplied to a second differential input of the fully differential mixer for the Q channel by the DC compensation current amount, thereby maintaining a DC common mode level of the Q channel.

8. The machine-readable storage according to claim 7, wherein the DC compensation current amount is variable.

9. The machine-readable storage according to claim 7, wherein the DC compensation current amount is a first DC compensation current amount, wherein the at least one code section comprises:
code for increasing a current supplied to a first differential input of a fully differential mixer for an I (in-phase component) channel by a second DC compensation current amount; and
code for decreasing a current supplied to a second differential input of the fully differential mixer for the I channel by the second DC compensation current amount, thereby maintaining a DC common mode level of the I channel.

10. A system for processing signals, the system comprising:
a first current source that enables adjustment in a transmitter of a current supplied to a first differential input of a fully differential mixer for an I (in-phase component) channel, the first current source being configured to increase the current to the first differential input of the fully differential mixer for the I channel according to a direct current (DC) compensation current amount;
a second current source that enables adjustment in the transmitter of a current supplied to a second differential input of the fully differential mixer for the I channel, the second current source being configured to decrease the current to the second differential input of the fully differential mixer for the I channel according to the DC compensation current amount, thereby maintaining a DC common mode level of the I channel.

11. The system according to claim 10, wherein the DC compensation current amount is variable.

12. The system according to claim 10, wherein the DC compensation current amount is a first DC compensation current amount, wherein the system further comprises:
a third current source that enables increasing a current supplied to a first differential input of a fully differential mixer for a Q (quadrature component) channel by a second DC compensation current amount; and
a fourth current source that enables decreasing a current compensation to a second differential input of the fully differential mixer for the Q channel by the second DC compensation current amount, thereby maintaining a DC common mode level of the Q channel.

13. The machine-readable storage according to claim 9, wherein the at least one code section comprises:
code for adjusting the current supplied to the first differential input of the fully differential mixer for the Q channel according to a DC common mode current amount; and
code for adjusting the current supplied to the second differential input of the fully differential mixer for the Q channel according to the DC common mode current amount.

14. The system according to claim 9, wherein the at least one code section comprises:
code for adjusting the current supplied to the first differential input of the fully differential mixer for the I channel according to a DC common mode current amount; and
code for adjusting the current supplied to the second differential input of the fully differential mixer for the I channel according to the DC common mode current amount.

15. The machine-readable storage according to claim 9, wherein the at least one code section comprises code for maintaining the DC common mode level of the I channel and maintaining the DC common mode level of the Q channel, where the DC common mode level of the I channel is equal to the DC common mode level of the Q channel.

16. The machine-readable storage according to claim 14, wherein the DC common mode current current amount is variable.

17. The system according to claim 12, wherein the first current source is further enabled to increase the current supplied to the first differential input of the fully differential mixer for the I channel by a DC common mode current amount; and
wherein the second current source is further enabled to increase the current supplied to the second differential input of the fully differential mixer for the I channel by the DC common mode current amount, without introducing a difference in DC common mode level between the I channel and the Q channel.

18. The system according to claim 17, wherein the DC common mode current amount is variable.

19. The system according to claim 17, wherein the third current source is further enabled to increase the current supplied to the first differential input of the fully differential mixer for the Q channel by the DC common mode current amount; and
wherein the fourth current source is further enabled to increase the current supplied to the second differential input of the fully differential mixer for the Q channel by the DC common mode current amount, without introducing a difference in a DC common mode level between the I channel and the Q channel.

20. The system according to claim 12, wherein the DC common mode level of the I channel is equal to the DC common mode level of the Q channel.

* * * * *

UNITED STATES PATENT AND TRADEMARK OFFICE
CERTIFICATE OF CORRECTION

PATENT NO. : 8,364,100 B2
APPLICATION NO. : 12/792905
DATED : January 29, 2013
INVENTOR(S) : Pan It is certified that error appears in the above-identified patent and that said Letters Patent is hereby corrected as shown below:

In the Claims

Column 12, line 30, Claim 15, delete the word "where" after the word "channel" and insert the word --wherein--.

Signed and Sealed this
Twenty-second Day of October, 2013

Teresa Stanek Rea
*Deputy Director of the United States Patent and Trademark Office*